United States Patent [19]

Chaum

[11] Patent Number: 4,949,380

[45] Date of Patent: Aug. 14, 1990

[54] RETURNED-VALUE BLIND SIGNATURE SYSTEMS

[76] Inventor: David Chaum, 14652 Sutton St., Sherman Oaks, Calif. 91403

[21] Appl. No.: 260,053

[22] Filed: Oct. 20, 1988

[51] Int. Cl.$^5$ .............................................. H04L 9/30
[52] U.S. Cl. ...................................... 380/30; 380/28
[58] Field of Search ................... 364/200, 900; 380/9, 380/24, 28, 30

[56] References Cited

U.S. PATENT DOCUMENTS 4,759,063  7/1988  Chaum .................................. 380/30
4,759,064  7/1988  Chaum .................................. 380/30

Primary Examiner—Stephen C. Buczinski
Assistant Examiner—Bernarr Earl Gregory
Attorney, Agent, or Firm—Nixon & Vanderhye

[57] ABSTRACT

A payer party obtains from a signer party by a blind signature system a first public key digital signature having a first value in a withdrawal transaction; the payer reduces the value of the first signature obtained from the first value to a second value and provides this reduced-value form of the signature to the signer in a payment transaction; the signer returns a second digital signature to the payer by a blind signature system in online consummation of the payment transaction; the paper derives from the first and the second signature a third signature having a value increased corresponding to the magnitude of the difference between the first and the second values. Furthermore, the following additional features are provided: payments are unlinkable to withdrawals; a shop between the payer and signer can be kept from obtaining more value than desired by the payer; the first value need not be revealed to the signer or intermediary in the payment transaction; the returned difference can be accumulated across multiple payment transactions; and the returned difference can be divided between a plurality of payment transactions.

14 Claims, 4 Drawing Sheets

RETURNED-VALUE BLIND SIGNATURE SYSTEMS

BACKGROUND OF THE INVENTION

1. Field of the Invention

This invention relates to transaction systems for value transfer, and more specifically to improved cryptographic techniques involving publickey digital blind signatures in online value transfers.

2. Description of Prior Art

Of the many proposed electronic payment systems for consumers, only a few allow consumers to ensure that all their transaction data is not linked together into a file on their activities. This property is anticipated to become important in achieving consumer acceptance of automated payment systems, particularly as consumers become more sophisticated about the issues and as systems become more extensive and pervasive.

The underlying technique for allowing consumers to protect their privacy in electronic payments was disclosed in U.S. Pat. No. 4,759,063, titled "Blind Signature Systems," issued to the present applicant, also appearing as European Patent Publication No. 0139313 dated 2/5/85, and which is incorporated herein by reference. A characteristic of these systems is that the payer withdraws money from an account in the form of digital signatures that are later presented in payments. Thus, some provision is needed to at least discourage payers from spending the same digital signature more than once.

For relatively-low-value payments, this "multiple-spending" problem can be addressed by techniques that compromise the privacy of those attempting to show the same signature more than once, as described in the co-pending application of the present applicant, titled "One-Show Blind Signature Systems," filed 3/3/88, with U.S. Ser. No. 168,802, now abandoned.

While such offline techniques may be suitable for a certain segment of payments, the present application is concerned with those other payments requiring the higher security of online verification. For these medium- and higher-value payments, the cost of consulting an online list of already spent digital signatures should be acceptable.

An essential difficulty with currently known online systems, however, is that they generally require a separate digital signature for each denomination. It is believed that one of the most efficient denomination schemes is that based on the powers of two: a one cent digital signature, a two cent signature, a four cent signature, an eight cent signature, and so on. To make a payment, the payer would use the appropriate selection of denominations, much as with coins and bank notes today. For amounts in the neighborhood of $10, for instance, even this binary scheme would entail at least 10 different denominations, approximately half of which would be involved in each payment. For larger amounts, the number of denominations grows logarithmically, so that in the $500 range, 16 denominations are needed, and an average of half are still required for uniformly distributed amounts of payment. When interest is to be earned on value held by the payer, fractional-cent amounts can be needed, further increasing the number of denominations that must be handled.

Of course all these denominations would take up considerable space in a hand-held computer that might be carried by a consumer to the point of sale. They also must be communicated to the retailer and relayed to the payment system provider. Moreover, the system provider must store each of the signatures separately and must look all the signatures submitted for a payment up on the list of already accepted numbers, before giving an O.K. to the shop. Thus, multiple denominations expand the storage and communication costs and might cause appreciable delays.

Additionally, there is the problem of what to do when the payer does not happen to have the proper complement of coins to pay the exact amount, but only a larger amount. It appears then that further signatures would have to be exchanged to return the unspent value. This might also raise the concern that the shop should not be able to improperly obtain the change itself. Furthermore, the complement of coins held by a payer, once revealed, could be used to infer other information about the payer. One thing about which something may be deduced is how much money the payer happens to have at the moment. Another thing revealed might be which other payments could have or could not have made by the particular payer, because of the exact coins involved.

OBJECTS OF THE INVENTION

Accordingly, an object of the present invention is to reduce the requirement for storage of numbers representing value. For the payer, this means reducing the amount of storage needed to maintain value stored within the payer's equipment, such as a card computer. For the shop, this means simply reducing the amount of data that must be held temporarily before it is forwarded to the bank. For the bank, it means reducing the storage required for already spent numbers—as well as the number of accesses to this database required during acceptance of a payment.

Another object of the present invention is to reduce the amount of information that must be transmitted: between the payer and shop, as well as between the shop and bank. This in turn can reduce the time and expense of completing a transaction with a given communication technique.

A further object of the invention is to hide from the bank the exact amounts involved in payments made by a payer, and to accomplish this by aggregating the unspent value.

Yet another object of the invention is to hide, both from the shop and from the bank, the total value of the instrument being offered by the payer.

A still further object of the invention is to allow the payer to build new payment instruments from the returned value. These instruments might even be indistinguishable from those directly issued by banks.

Yet a further object of the invention is to prevent a payer from being vulnerable to a shop taking more value (or change) for itself than the payer has agreed.

Still another object of the present invention is to allow efficient, economical, and practical apparatus and methods fulfilling the other objects of the invention.

Other objects, features, and advantages of the present invention will be appreciated when the present description and appended claims are read in conjunction with the drawing figures.

BRIEF DESCRIPTION OF THE DRAWING FIGURES

BRIEF SUMMARY OF THE INVENTION

Figure 1:
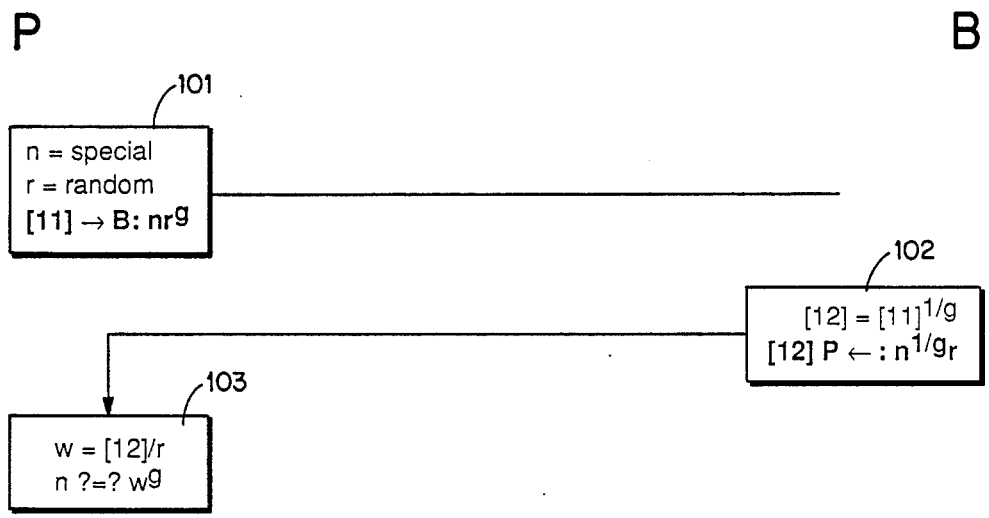
FIG. 1 shows a flowchart of a preferred embodiment of a withdrawal transaction protocol for a bank to issue value to a payer in accordance with the teachings of the present invention.

In accordance with these and other objects of the present invention, a brief summary of some exemplary embodiments is presented. Some simplifications and omissions may be made in the following summary, which is intended to highlight and introduce some aspects of the present invention, but not to limit its scope. Detailed descriptions of preferred exemplary embodiments adequate to allow those of ordinary skill in the art to make and use the inventive concepts are provided later.

Each different denomination (i.e. "coin value") is represented by a different public exponent, but all signatures use the same RSA modulus of the bank. A single signature might contain a plurality of denominations; it would thus have a public exponent that is the integer product of the public exponents corresponding to the denominations it contains. This allows a particular denomination to be removed from the set of denominations present in a signature by anyone raising the signature to the public exponent corresponding to the denomination to be removed.

It is assumed, as already mentioned above, that each payment is deposited online. It is also assumed that a payer has a signature containing at least a suitable combination of denominations for making each payment.

First the payer devalues the signature, as explained above, so that it represents the exact amount to be paid. Then this is provided to the bank, via the shop, along with a second number. This second number is "blinded," as explained in the already mentioned U.S. patent titled "Blind Signature Systems." The bank checks that the signature on the first number received contains the appropriate denominations and makes a signature on the second number, which is then returned to the payer. The payer "unblinds" this second number, as also described in the already mentioned U.S. patent titled "Blind Signature Systems."

Several variations on the inventive concepts disclosed here are provided by exemplary embodiments described in detail later. For example, the embodiment of FIG. 2 can implement a "cookie-jar" scheme in which all the surplus value returned to a payer is accumulated in a single number that is ultimately deposited, such as when the next withdrawal is made. Another example, detailed in FIG. 3, also assumes that the total original value of the signature, which has been devalued for payment, is known to the bank, but provides for the possibility of plural original values. The bank returns the exact amount in a form that allows only someone possessing the original signature having the known original value to recover the returned value. This embodiment (like that of the following figures) also has the ability to readily allow the returned signatures to be used in constructing signatures that can used in payments in a way indistinguishable from originally withdrawn values—thus change can be recycled into money of the same form as that freshly withdrawn from the bank. The embodiment detailed in FIG. 4, extends that of FIG. 3 at least by allowing the original value to be kept secret from the bank and by not requiring extra work to anticipate each value it might have.

Figure 5:
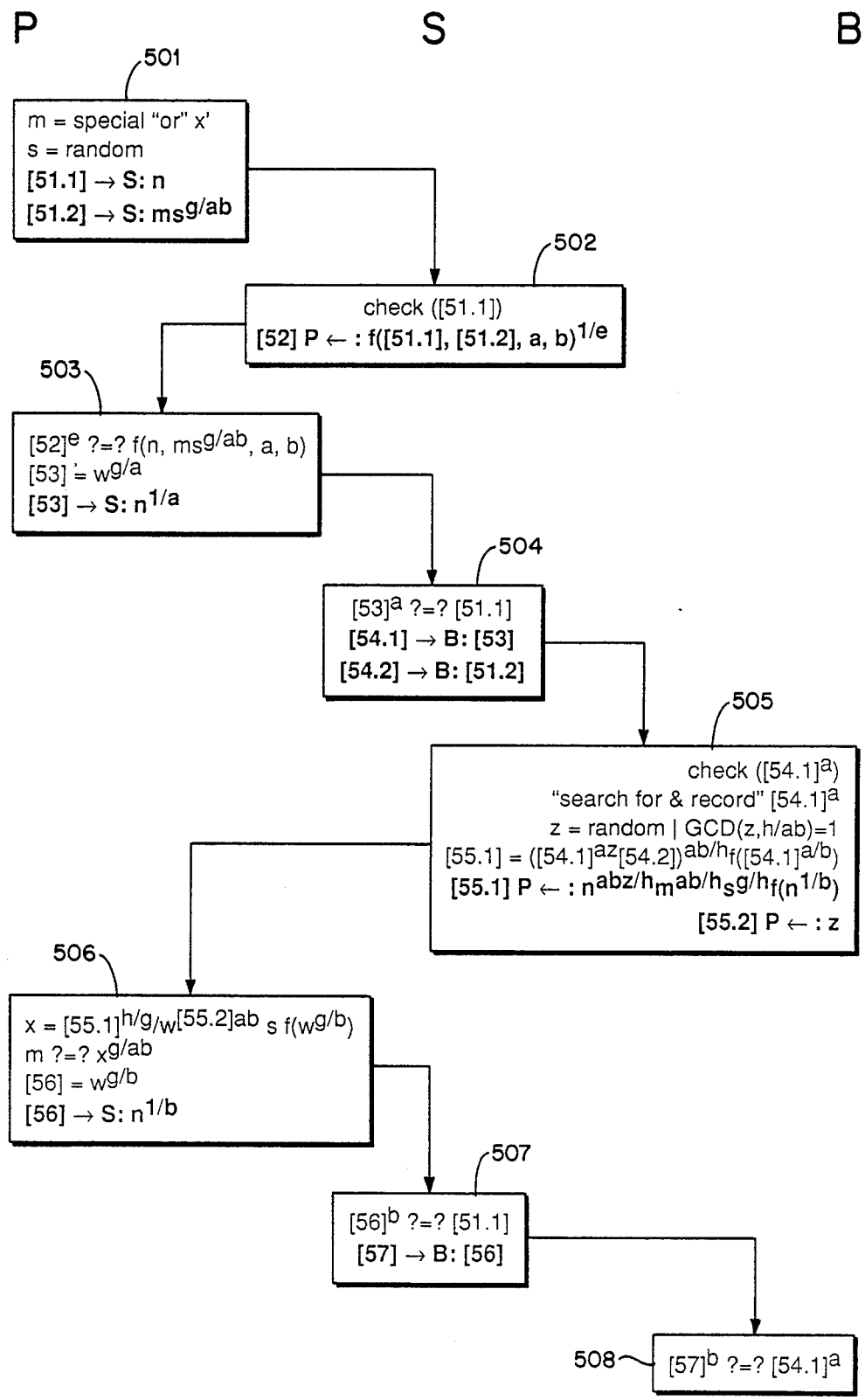
FIG. 5 shows a flowchart of a preferred embodiment of a two part payment protocol including signed agreement and a single consummation point, also with hidden returned and spendable value, and with returned value useable in subsequent payments, all in accordance with the teachings of the present invention.

The variation detailed in FIG. 5 illustrates several extensions and variations at once. One is that the techniques of FIG. 2 and FIG. 3 can be combined in a single payment. Another is how more secure payments can be carried out in a series of steps that reduce the exposure of the parties at each point. Also achieved is a "safe point" in the transaction process where the payer must provide a single number in exchange for the goods: the payer does not benefit from withholding the number; the payer does not need to rely on the shop to return any further numbers; and the shop can check the number immediately without communicating with the bank. The actual deposit by the shop can be made later at the shop's leisure.

Figure 6:
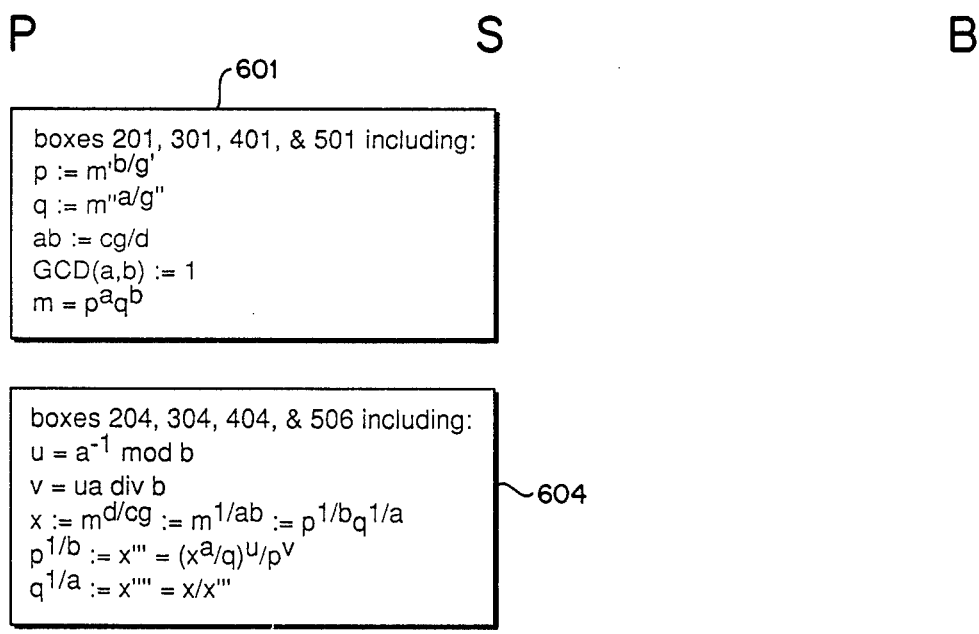
FIG. 6 shows modifications to the flowcharts of the preferred embodiments of FIGS. 2-5 that allow returned value to be divided among multiple subsequent payments in accordance with the teachings of the present invention.

In FIG. 6, some modifications to the embodiments of FIGS. 2-5 are disclosed. They allow the value returned to be divided between two numbers. How the returned value is distributed among the numbers, and even the fact that any such division is taking place, is believed to be perfectly hidden from the shop and bank. Thus, the single blinded number provided by the payer is formed in a way that allows its signed form to be split into two signatures, with the returned value split between them.

GENERAL DESCRIPTION

The protocols to be described in detail later and the drawing figures make a number of simplifying assumptions for concreteness and for clarity in exposition. It will be appreciated, however, that these should not limit the scope of the invention.

The denomination scheme already described and mentioned again later, for instance, is just one example. Other schemes might use quite different selections of denominations. For example, denomination schemes closely copying those already in use with particular currencies around the world are possible. There might also be redundancies, as with actual currencies that have multiple types of coins or notes for the same denomination. It should also be pointed out that, in some cases, an exponent standing for a lower value denomination might divide a higher valued one. A common factor among plural denomination public exponents might also offer certain advantages. Denominations closer to a single coin type might be used for the lower values, thereby hiding the combinations of amounts more fully. It is even possible, of course, for a single denomination to be used, with multiplicities of the public exponent standing for higher values, such multiplicities being mentioned again later.

The choice of party names, and the number of parties are also examples of choices made for clarity and convenience. Naturally, the inventive concepts disclosed here should not be interpreted as limited to particular types of parties such as banks, shops, and consumers. They are applicable in any context where value, wether economic or otherwise, is to be transferred between parties. Furthermore, the fact that a shop is shown in between the payer and the bank is just to indicate that such a position could be filled. However, no such party is needed, or more than one can be cascaded. When the payer interacts with the bank directly, no shop party is needed; when the payer interacts with a shop, who interacts with its bank, who interacts with a central bank or bank association—more parties are added into the chain.

DETAILED DESCRIPTION OF PREFERRED EMBODIMENTS

While it is believed that the notation of FIGS. 1-6 would be clear to those of ordinary skill in the art, it is first reviewed here for definiteness.

The operations performed are grouped together into flowchart boxes. The column that a box is in indicates which party performs the operations defined in that box. The columns are labeled by party name across the top: "P" for payer, "S" for shop, and "B" for bank. Some operations show how messages are formed on the right of the equal sign with the message number (shown in square brackets) on the left of the equal sign. The operation of saving a value under a symbolic name is denoted in the same way as that of forming a message, except that the symbolic name appears on the left instead of a message number.

Another kind of operation is an equality test. The "?=?" symbol is used to indicate these tests, and the party conducting the test terminates the protocol if the equality does not hold. (If the test is the last operation to be performed by a party during a protocol, then the success or failure of the test determines the party's success or failure with the protocol.)

A further kind of operation is that of sending a message. This is shown by a message number on the left; followed by a recipient name and an arrow (these appear for readability as either a recipient name then left pointing arrow, when the recipient is on the left; or right pointing arrow then recipient name, when the recipient is on the right); followed by a colon; finally followed by an expression fully denoting the actual value of the message that should be sent, expressed using variables whose values could be unknown to the sender.

The final kind of operation (which can also appear as part of an expression, as described below) is a definition, denoted by expressions separated by ":=". Such notations are included only for clarity and readability and do not indicate actual computations performed; rather, they are a way of indicating the equivalence of certain expressions.

Several kinds of expressions are used. One is just the word "random". This indicates that a value is preferably chosen uniformly from an appropriate set of values, defined in the text, and independently of everything else in the protocol. Thus a party should preferably employ a physical random number generator for these purposes, possibly with appropriate post-processing. In practice, however, well known cryptographic and pseudo-random techniques may be applied, possibly in combination with physical sources. For clarity, explicit restriction on the resulting values may be shown as a predicate following a "|" (read "such that"). The restrictions shown in this way happen to require the GCD of two numbers to be 1, which means that no integer greater than 1 divides both. In some cases, where more than one expression would be appropriate, the choice depending on the particular application and instance of the protocol defined, alternative expressions may be separated by "or".

Other kinds of expressions relate to creating and testing the redundancy used for digital signatures. While there are many suitable redundancy schemes known in the art, and many more that would be obvious to those of skill in the art, a particular notation has been adopted here for clarity in exposition, and should thus not be taken to limit the scope of the present invention. The notation "special" is a variant on "random" described above. It produces values that are unpredictable, to at least some parties, and yet which have a redundancy property. For concreteness, a special number may, for example, be taken to be the concatenation of a random value and its image under a suitable one-way function.

A corresponding monadic predicate, denoted "check" followed by its argument, has the same effects as the equality test mentioned above: if the argument has the redundancy property, then the check behaves as if equality were found; if the argument does not have the property, then the check behaves as if inequality were found. A similar predicate, "search for & record" followed by a single argument, merely looks-up its argument in some suitable data storage system and enters the argument into that system as a side-effect. (These two operations should preferably exclude any similar operation in time, to prevent anything from not being found more than once.) If the argument was not found during the look-up, the effect on the rest of the protocol is the same as that of the case of equality described above; if it was found, then the effect is that of inequality.

A further kind of expression involves exponentiation. All such exponentiation is in a finite group, for example the multiplicative group modulo an RSA modulus, as described later. When no operation is shown explicitly, multiplication in such a group is assumed. When "|" is applied between elements of such a group, the result can be calculated by first computing the multiplicative inverse for the expression on the right and then multiplying the result with the expression on the left—but this may also be called simply a quotient. The results of all such operations on group elements may be assumed for concreteness to be encoded as binary numbers, with the least positive representative, for instance, being suitable when the elements are residue classes. When the "|" is used with integers, such as those serving as exponents, then it denotes integer division if the result is an integer; if the result is a proper fraction, however, it obviously represents a corresponding root, as are well known in the art.

Figure 2:
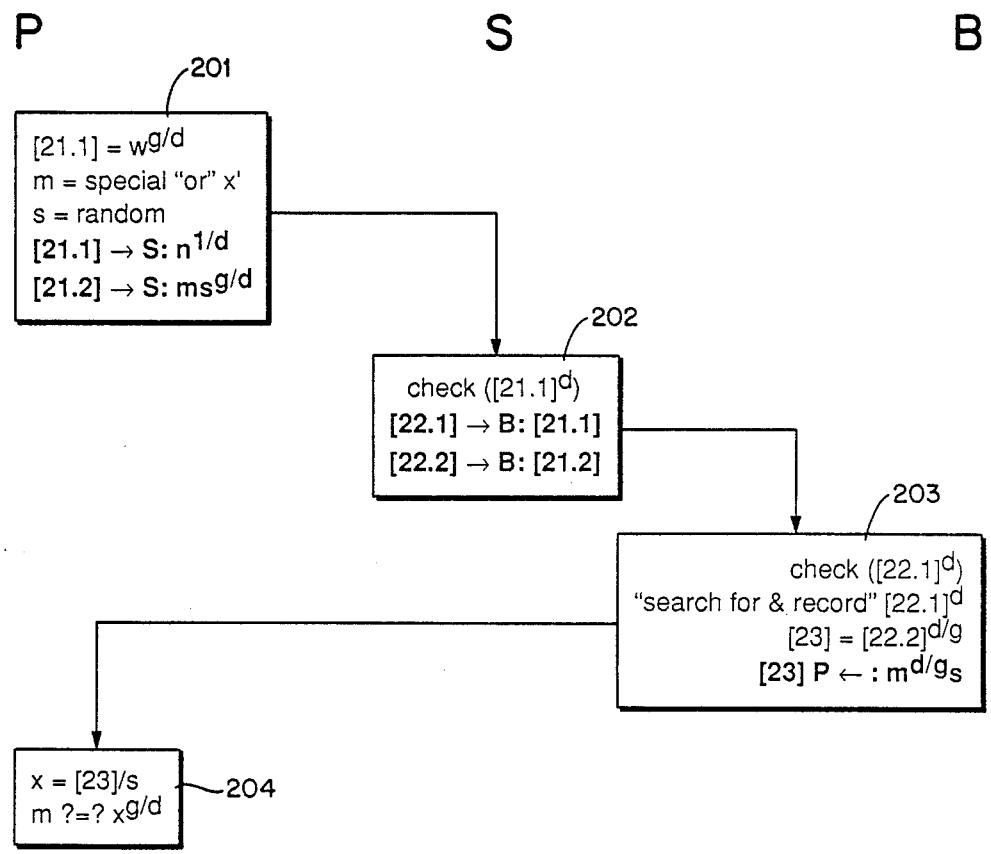
FIG. 2 shows a flowchart of a preferred embodiment of a payment transaction protocol allowing a payer to accumulate returned value in accordance with the teachings of the present invention.

One or more moduli may be used, such as RSA moduli, as are well known in the art, having been first proposed in "A method for obtaining digital signatures and public-key cryptosystems," by Rivest, Shamir and Adleman, *Communications of the ACM*, Feb. 1978, pp. 120–126. For simplicity, concreteness, and clarity, and without loss of generality, all elements will be taken to be residues modulo the RSA modulus of party B, unless mentioned otherwise. The public exponents of party B used in all the figures are taken for simplicity to be the prime divisors of h, each of which is taken to correspond to some denomination. (This is believed to mean that h should be coprime with the order of the group or subgroup used.) For example, a binary denomination scheme may be preferred, where the smallest divisor (say 3) represents 1 cent, the next smallest (say 5) represents 2 cents, the next (say 7) represents 4 cents, and so on, pairing the odd prime exponents with the powers of two—up to the largest divisor of h. Some of these factors are taken to comprise g, g', and g". The integer d (mnemonically representing "denominations paid") is taken to be a divisor of g, thus having a subset of the factors of g. The integer c (mnemonically representing "change returned for overpayment") is a divisor of h, but coprime with g. In FIG. 2, a second modulus of B is preferably also used to separate two different classes of signatures (but the same effect might be obtained by using different sets of exponents, as would be obvious to those of skill in the art). The public exponent of S used in FIG. 5 is e, which is preferably used with a modulus different from that of B.

The function f is a public one-way function, such functions being well know in the art. It may be assumed to have a domain able to include the result of the largest group operation and a range small enough to be represented in such a group—as well as being suitable for constructing signatures.

Turning now to FIG. 1, the first part of a flowchart for the preferred embodiment will now be described in detail. It may be thought of as a withdrawal transaction, in which party P withdraws a certain amount of value, represented by g, from party B.

Box 101 shows party P choosing n as a special number, such partly random selection as already mentioned above. Similarly, P also chooses r from the non-trivial residues of B's RSA modulus, uniformly and at random, such random selection also as already mentioned. Then P forms message [11], as per the notation already described above, by raising r to the power g and multiplying the result by n, all in the group of residues. This message [11] is then sent from P to B. (Note that since the expression of the message clearly shows the method used to construct it, the forming and sending operations have obviously been combined for clarity.)

Box 102 indicates that, after receiving message [11], B first signs it by forming the g'th root, as B can of course do using the factorization of the modulus it created, as is well known in the art. (The value of g is assumed known to both P and B in this protocol, as it will also be in that of FIG. 2 and at least partly in FIG. 3.) Then the result, which has been denoted as message [12], is sent by B to P. (Notice that the form of this message has been shown for clarity as r times the g'th root of n, as a part of the notation for sending a message, as previously described; this does not, however, as also mentioned above, mean that B can determine the value of r or that of n.)

Box 103 describes first how the value denoted by symbolic name w (with mnemonic meaning "withdrawal") is calculated by P. The message [12] received is multiplied by the multiplicative inverse of r, as per the notation described above, to yield w. Finally, P tests w by raising it to the g power and comparing the result for equality with n. If the test is satisfied, P completes the protocol successfully, otherwise not.

Turning now to FIG. 2, the second flowchart for part of the preferred embodiment will now be described in detail. It may be though of as a payment transaction, in which party P gives to S a certain amount of value, represented by d, and receives in return what remains of g.

Box 201 begins with P forming message [21.1] as w, from FIG. 1, raised to an integer power. This integer is computed by P as g divided by d. Next, P chooses from one of two alternatives: (1) P sets m to x' from a previous instance of FIGS. 2–5; or (2) P forms m as a special number, much as n was formed in FIG. 1, except it is preferably in a second multiplicative group, i.e. using a different modulus than that which is used in FIG. 1 (or the other figures). Similarly, s is chosen at random, as r was in FIG. 1, but using this same second modulus. The second modulus is preferably chosen by B, who knows its factorization. Two messages are sent by P to B: [21.1], which has already been computed and is the d'th root of n; and [21.2], which is formed as the product of m times s raised to the integer g/d mentioned above, modulo the second modulus.

Box 202 shows that S first raises message [21.1] received from P to the d power under the first modulus and then applies the check predicate to the result. As already mentioned, this predicate will stop the protocol with failure if the redundancy property is not present in its argument. The rest of this box merely shows that S forwards the two messages received, [21.1] and [21.2], on to B as messages [22.1] and [22.2], respectively.

Box 203 is first the checking by B of the message [22.1] received, just as [21.1] was checked by S. Then B searches for n in its storage system. If n is found to be stored, B terminates the protocol with failure; otherwise, B records n in the storage system—as called for by the notation already explained. Then B signs message [22.2] received, by raising it to the fractional power d/g. This could of course be carried out by means widely known in the art, such as, for example, extracting the g'th root and then raising to the d'th power. In any case, this arithmetic should be done over the same group as that in which message [22.2] was originally formed; that is, using the second modulus already mentioned. The result of the signing is message [23], which has the form m to the d/g times s; this message is shown as sent by B to P, although it could of course also be forwarded by intermediate parties, such as S.

Boxes 204 represents the "unblinding" of message [23] received by P and its testing. Of course, these could be done in any order, by a variety of means. The particular notation shown first isolates that part of the message that will be referred to later on as x, simply by dividing s out of message [23] (i.e., forming the quotient, as already mentioned, by first computing the multiplicative inverse of s modulo the second modulus and then multiplying this, modulo the second modulus, by message [23]). The final testing of the result is shown as raising x to the integer g/d power, and testing the result for equality with m. As mentioned above, the success of this equality test determines the success of the protocol for P.

As will be appreciated, the use of the second modulus mentioned as preferred in the protocol of FIG. 2, together with, say, a single value of g for each instance of the protocol of FIG. 1, gives what may be referred to as a "cookie-jar" system. A payer would substitute x from a previous instance of the protocol of FIG. 2 as m in a subsequent instance of FIG. 2 (instead of creating m as a new special number). Thus, in each such iteration, more roots are built up on x; all the change that P deserves from spending only $d_i$ out of g in the i'th iteration is added to that stored in the cookie jar x. In particular, multiplicities of roots are counted in P's favor; that is, if, say, a third root of a number having the redundancy property under the second modulus is worth one cent, then a ninth root of such a number is worth 2 cents, a 27th root 3 cents, and so on. Obviously, a cookie jar might be cashed in to B in a separate transaction not shown explicitly here for clarity.

Figure 3:
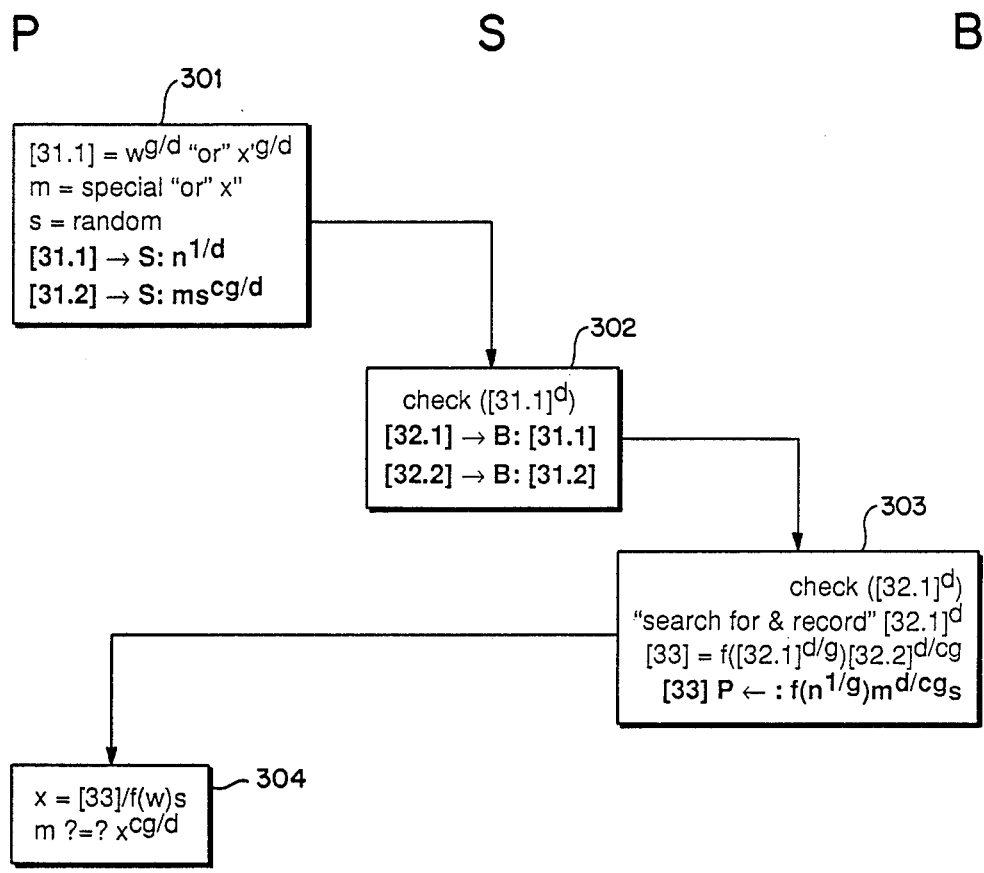
FIG. 3 shows a flowchart of a preferred embodiment of a payment transaction protocol with returned value that can be used in subsequent payments, but with the spendable value known to the shop and bank, in accordance with the teachings of the present invention.

Turning now to FIG. 3, the third flowchart for part of the preferred embodiment will now be described in detail. It may also be thought of as a payment transaction, in which party P gives a certain amount of value, represented by d, and receives what remains of g in return—it differs from FIG. 2 above, though, in that the remaining value must be possessed by P if the returned value is to be used. Also, optional change c is returned to P, possibly in compensation for overpayment.

Box 301 indicates how P creates message [31.1] as w raised to the integer g/d power or x' raised to the g/d power, the choice depending on the instance of the protocols, as discused later. Also shown is how P forms m, either as a special number or as a value x" drawn from a previous instance of one of the protocols of FIGS. 2–5, as will be discussed. Again, as already described in FIG. 2, P chooses s at random from a suitable distribution. Unlike the embodiment of FIG. 2, but as in the other figures, however, the same modulus is preferably used here for n and m. When message [31.1] is sent by P to S, it contains the d'th root of n. Message [31.2], also sent by P to S, is formed as the product of m times s raised to an integer power. This integer is computed as c times g, the quantity divided by d.

Box 302 then defines how, after receiving [31.1], S test it by raising it to the d'th power and using the check predicate to test the redundancy property of the result. If this succeeds, then S forwards messages [31.1] and [31.2] as received to B as messages [32.1] and [32.2], respectively.

Box 303 shows how B first checks message [32.1] received, just as S did for [31.1]. Then B applies the "search for & record" predicate, as already described and used in FIG. 2, with argument [32.1] raised to the d (which is equal n). When this succeeds, B forms message [33] as the product of two factors. The first factor is the result of applying f, as already defined, to the d/g'th root of message [32.1]; this simply yields f of the g'th root of n. The second factor is message [32.2] raised to the d/cg power, such fractional powers having already been described; this yields s, times m to the d/cg power. The product is then forwarded to P as message [33], possibly via intermediaries not shown for clarity.

Box 304 is the recovery and checking by P of the signature received as message [33]. First message [33] is divided by the product of s times f applied to w. Then x should be the d/cg'th root of m, which is checked by raising x to the integer cg/d power and testing the result for equality with m.

It will be appreciated that the w used in box 301 might have been derived from an initial transaction, such as that detailed in FIG. 1. Another possibility, however, is that w represents a value of x,x",x''', or x'''' from some instance of FIGS. 2–5, for example a previous instance of FIG. 3. (The techniques of FIG. 6 could even be applied, but discussion of this is postponed until that figure is described in detail later.) It will also be appreciated that, while P makes use of the knowledge of g, such knowledge is not strictly necessary for B, since, for instance, B could issue multiple versions of message [33], each assuming a different value of g—then P could use the techniques of box 304 on the version having the correct value of g. Of course the cookie jar approach could still be followed here. But it will further be appreciated that, when the same modulus is used for FIG. 1 and FIG. 3, P may be able to develop roots on special numbers, denoted x with various numbers of primes, through instances of the protocol of FIG. 3, for example, that can then be spent in later instances of this protocol.

Figure 4:
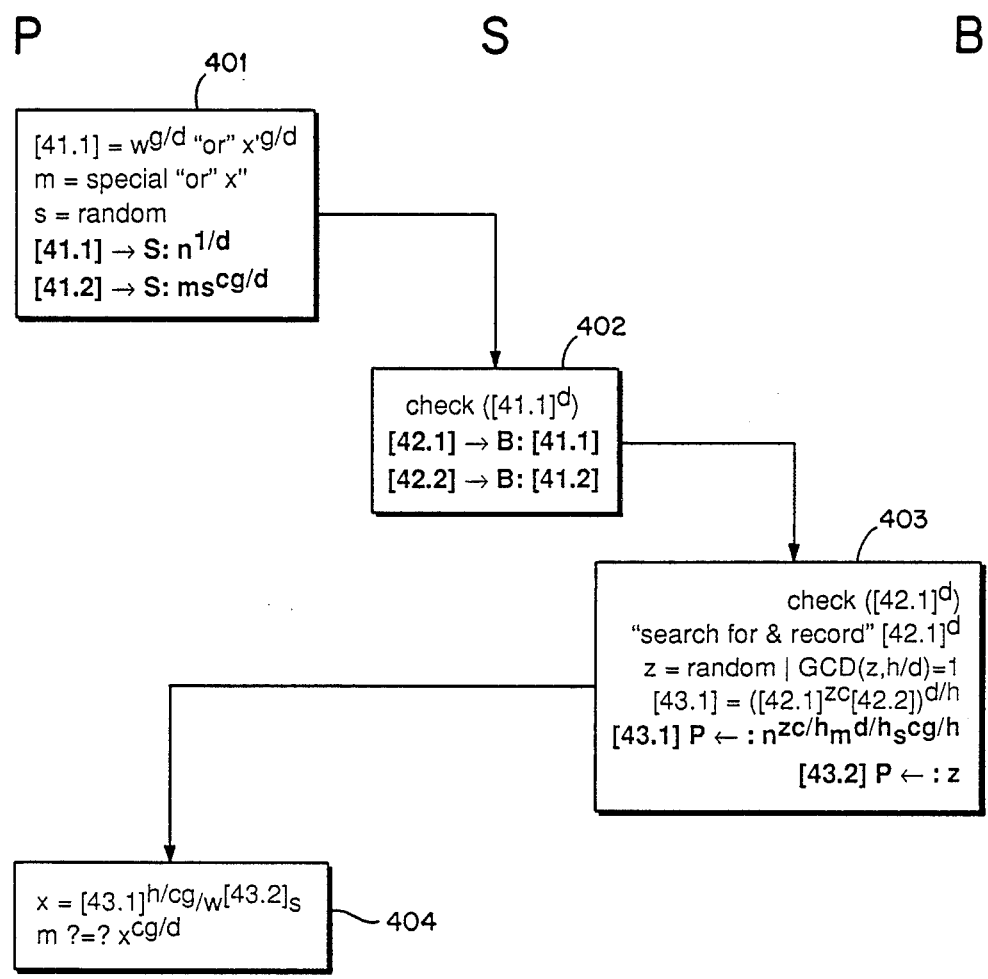
FIG. 4 shows a flowchart of a preferred embodiment of a payment transaction protocol with hidden returned and spendable value, and with returned value useable in subsequent payments, all in accordance with the teachings of the present invention.

Turning now to FIG. 4, the fourth flowchart for part of the preferred embodiment will now be described in detail. Like FIG. 3, this one may also be thought of as a payment transaction wherein P gives an amount represented by d and receives what P holds of g plus optional change c (no change means c=1). The value of g can be kept by P from S and B, without the multiplicities of values mentioned as needed for this in the description of FIG. 2.

Box 401 shows P forming message [41.1] as w raised to the integer g/d, or as x' raised to the integer g/d, the choice depending on the instance of the protocol as already mentioned, to yield the d'th root of n. As in FIG. 3, m is formed as either a special number or a copy of a previous x", and s is formed at random over the residues modulo the composite issued by B. Message [41.2] is formed as the product of m times s raised to the integer cg/d. These two messages, [41.1] and [41.2], are then sent by P to S.

Box 402 indicates first how S tests message [41.1] by raising it to the d power and applying the redundancy check predicate already described. When the test is successful, S forwards to B the two messages received, [41.1] and [41.2], as [42.1] and [42.2], respectively.

Box 403 depicts first the same testing performed by B on message [42.1] received: it is raised to the power d and the predicate check is applied. Also, as in boxes 203 and 303, the d'th power of [42.1] is searched for in a storage system and recorded if not found; if it is found, the protocol fails. Next, an integer z is created at random by B. Following the notation introduced earlier, this integer is required to be coprime with the integer h/d. It is believed that a suitable interval from which to choose z is the integers between 2 and (h/d)-1. It is believed further that the creation of z should ideally yield each non-zero residue class, modulo each prime divisor representing value, with substantially equal likelihood. Next B forms message [43.1] as the d/h power of a product of two factors. The first factor is message [42.1] raised to the integer power zc; the second is message [42.2]. The actual result sent to S by B as message [43.1] is shown as having the form of a product of three factors: n raised to the zc/h; m raised to the d/h; and s raised to the cg/h. Also, z is sent, possibly directly, to P as message [43.2].

Box 404 illustrates first the extraction of x from messages [43.1] and [43.2] received. The value of x is formed as a quotient. The numerator is message [43.1] raised to the integer h/gc. The denominator is the product of w raised to the integer contained in message [43.2] times s. (Actually, as already mentioned, the multiplicative inverse of the denominator can be formed and multiplied by the numerator in evaluating such an expression.) Finally, the result is tested by raising x to the integer cg/d power and comparing the result for equality with m.

It will again be appreciated that the w used in box 401 might have been derived from an initial transaction, such as that shown in FIG. 1. It also again remains possible that w represents a value of x from some instance of FIGS. 2–5, such as a previous instance of FIG. 4. (Discussion of the techniques of FIG. 6 is again postponed.) It will now also be appreciated that there is no need for P to reveal the value of g to S or to B—the system allows this to be hidden perfectly. (The cookie jar approach is of course still possible here.) Also, again, the choice of an x as m allows value in the form of roots to be built-up, possibly for eventual use as a w. On the other hand, as would be obvious to those of skill in the art, it is believed preferable that the exponents representing value returned (divisors of h in general) be large enough to make the chance that someone could guess a random residue modulo one of them acceptably small relative to its corresponding value.

Turning now to FIG. 5, the fifth flowchart for part of the preferred embodiment will now be described in detail. Like FIGS. 3 and 4, this one may also be thought of as a payment transaction wherein P gives an amount represented this time by the factors of the product ab and receives, on m, what P holds of g. (Because of the previous figures, it would be obvious to those of skill in the art how to include change c, and thus it is omitted here for clarity.) Again, as readily accomplished in FIG. 4, the value of g can be kept by P from S and B. Here, payment is in two parts, first an amount represented by a is given, then an amount represented by b. Before anything is given, though, S provides P with a signed confirmation of particulars.

Box 501 shows how P first forms m as a special number or as a previous x', and s as a random residue modulo the modulus of B. Then P sends two messages to S: the first, [51.1], contains n; the second, [51.2], is formed as the product of m times s raised to the integer g/ab.

Box 502 expresses how S first tests message [51.1] received, to ensure that it contains the redundancy property, using the already-described predicate check. In the case of success, S forms a digital signature, having a public exponent e, this time preferably using its own modulus. (It will be obvious to those of skill in the art that any digital signature technique could be used here, but that an RSA-like one is a suitable illustration.) The signature is shown as the e'th root of an image under f. The pre-image under f is a four tuple, made up of: message [51.1], message [51.2] received, a, and b. This signature is supplied by S to P as message [52].

Box 503 indicates how P first tests the signature in message [52] received. The image under f of four elements is computed: n, m times s to the g/ab (already computed for message [51.2]), a, and b. This image is then compared for equality with the e'th power of message [52], modulo S's modulus. Next, message [53] is shown as computed by raising w to the integer g/a power, to yield the a'th root of n. This is then sent by P to S.

Box 504 first illustrates a test performed by S on the messages [51.1] already received and message [53] recieved. The test is for equality between the latter raised to the integer a power and the former. If the equality holds, then S forwards messages [53] and [51.2] to B as messages [54.1] and [54.2], respectively.

Box 505 shows how B first tests one of the two messages received, [54.1]. It is raised to the integer a power and the check predicate applied to test for the redundancy property already mentioned. Provided this test is passed, the "search for & record" predicate is applied to the a'th power of message [54.1], just as in FIGS. 2–4. Further, provided the value of n was not found to be already recorded during the process of recording it, a value of z is formed at random. This is essentially the same as in FIG. 4, except that exponents a and b are used in the restriction in place of d. Thus z might be, for the purposes of the exemplary embodiment illustrated in this figure, a random integer chosen coprime with h/ab and from the interval 1 to h/ab. Next B forms message [55.1] as a product of two things. The first factor is itself a product of message [54.1] raised to the integer az times message [54.2] received, the product raised to the ab/h power. The second factor of message [55.1] is the image under f of message [54.1] raised to the a/b power. Thus, message [55.1] is believed to have the form shown as the product of: n raised to the abz/h power, m raised to the ab/h power, s raised to the g/h power, and the image under f of the b'th root of n. Along with message [55.1], B also sends P message [55.2], which contains z.

Box 506 specifies how P first extracts, from the two messages recieved, the returned value x as a quotient. The numerator is message [55.1] raised to the integer h/g. The denominator is the product of three factors: w raised to the integer product of [55.2] times ab; s; and the image under f of w raised to the integer g/b. The form of these messages is then tested by raising x to the integer g/ab and comparing the result for equality with m. Provided this test is successful, message [56] is formed as w raised to the integer g/b. This results in the b'th root of n, which P then forwards to S.

Box 507 details testing of this message [56] received by S. The b'th power of the message is computed and the result is compared for equality with message [51.1] already received. If this test succeeds, then message [56] is forwarded by S to B as message [57].

Box 508 indicates how B tests messages [57] received and message [54.1] already received: the former is raised to the power b and the latter to the power a, and the two results are compared for equality.

It will be appreciated that the value of g is again hidden from B, as in FIG. 4. It will also be appreciated that once the test of box 504 is successfully completed, P is locked into the transaction, forfeiting the entire value by "walking away." On the other hand, P is protected by the signature issued by S. It will additionally be appreciated that once box 506 is reached, P has given away the value represented by a, but has access to all the returned value provided the value b is held; S is awaiting the promised value represented by b. Thus, at this point, there is little if any incentive for P not to provide S with the value b, and for S not to in exchange make available that outside-the-system value desired by P. It will further be appreciated that S can hold message [56] before sending it, until some convenient time, since its acceptance by B is assured.

Turning now to FIG. 6, the sixth flowchart for part of the preferred embodiment will now be described in detail. It expresses modifications to some boxes of FIGS. 2-5, thereby offering further features and advantages. In particular, the value of m shown can be combined from two previous instances of the protocols of FIGS. 2-5. The results derived in the modified versions of subsequent boxes can re-distribute the value among the original m's.

Box 601 indicates how boxes 201, 301, 401 and 501 can be modified. First four definitions are given for clarity, such definitions having been already described and not requiring any computation in carrying out the protocol. Variable p is defined to be some particular m, from another instance of a protocol, which is denoted m' and is lacking the b'th root in order to have the complete g' root. Similarly, q is defined to be m'' lacking only the a'th root of the g'' root. This notation is intended to suggest that the b'th root on m' and a'th root on m'' are sought by P, in order for P to obtain g' and g'' roots on m' and m'', respectively. A third definition is that the product ab is to be taken as equal to the integer quotient cg/d. This is intended to convey that the prime factors of cg/d are divided into two parts: one making up the integer a and the other making up the integer b. A fourth definition introduces the important restriction that a and b are coprime, such notation having been already described. The action introduced by the box modification indicated by box 601 is that m not merely be taken as a new special number or an x as previously suggested in the boxes to be modified, but rather that m be computed as the product of two values. The first value is p raised to the power a, the second is q raised to the power b. The remainder of the modified boxes remain intact.

Box 604 shows potential extensions to boxes 204, 304, 404, and 506. First a value u is computed as the multiplicative inverse of integer a modulo integer b, such inverses being well known in the art and always defined when a and b are coprime (as was required above). Next, v is computed as the remainder after division of the integer product ua by the integer b. (The "mod" and "div" notations are well known in the computer art.) Some definitions are then shown for clarity. The unmodified boxes leave x as m to the d/cg power (where c is 1 in FIG. 2 and 5). Since ab has been defined in box 601 above as cg/d, x may also be written as the ab root of m. Because m was set to the product of p to the a times q to the b in the modifications described in box 601, x may further be defined as the product of the b'th root of p times the a'th root of q. The third computation called for in box 604 is for the value of x''' to be formed as a quotient: the numerator is the u'th power of the quotient of the quantity a'th power of x divided by the quantity q; the denominator is p to the v power. The value of x''' is defined to be the b'th root of p. The fourth and final computation is that x'''' is taken as the quotient of x divided by x'''. This means that the value of x'''' is defined as the a'th root of q.

It will be appreciated that, by forming m in the way described above, the value returned in the form of various roots of m can be divided among two different parts (p and q) of m. (While such dividing has been shown only for two parts in the interest of clarity, it would be obvious to those of ordinary skill in the art how to extend it to any number of parts.) It will be appreciated further that such division of value could be used to build up m's bearing such g'th roots that they themselves can serve as w's in instances of FIGS. 1-5.

As would be obvious to those of ordinary skill in the art, there are many essentially equivalent orders to evaluate expressions; ways to evaluate expressions; ways to order expressions, tests, and transmissions within flowchart boxes; ways to group operations into flowchart boxes; and ways to order flowchart boxes. The particular choices that have been made here are merely for clarity in exposition and are sometimes arbitrary. Notice, for example, that wether a signature is unblinded and then tested, as shown for clarity here, or first tested in blinded form and then unblinded, is quite unessential. Also, for example, the order in which messages are generated within a box and sent may be of no significance.

It will also be obvious to those of ordinary skill in the art how parts of the inventive concepts and protocols here disclosed can be used to advantage without necessitating the complete preferred embodiment. This may be more fully appreciated in light of some examples. FIG. 5, for example, shows a variety of techniques, some of which can be omitted if desired: the signature issued in box 502 can be dispensed with, or it might be issued only after some initial amount of value or even non-value signature is received.

Certain variations and substitutions may be apparent to those of ordinary skill in the art. For example, any abelian group with public group operation and order known only to B can be used instead of RSA. Instead of primes to represent each denomination, as already suggested, composites could of course be used. Multiplicities of roots have only been explicitly mentioned in connection with FIG. 2, but such multiplicities may be used throughout the other figures as well. Similarly, any other invertable operation, instead of the multiplicative group operation, could be used to include and remove the image under f in FIG. 3 and FIG. 5.

Other example substitutions and variations related to the form of the numbers signed would be obvious also. The redundancy scheme shown does not explicitly include side information that is not signed but that is later used to verify the redundancy properties, as is well known in the art. Any such redundancy scheme could of course be used with the present techniques. For instance, the form of signatures in the already mentioned application titled "One-Show Blind Signature Systems" could be used. The value of such a signature could then depend on the particular pre-images as originally proposed and also the particular roots shown. The returned value could then be used to upgrade already issued signatures to higher value (but signatures might be required to have at least an initial validity signature not issued as returned value, to ensure that they are properly formed.) Also, certain additional roots could be returned to the payer for use in obtaining change, in the way proposed for the original one-show scheme. The techniques disclosed in FIG. 6 of the present application could further be applied to combine these signatures for change with those already mentioned as upgrades for payment, all in a single signature.

While these descriptions of the present invention have been given as examples, it will be appreciated by those of ordinary skill in the art that various modifications, alternate configurations and equivalents may be employed without departing from the spirit and scope of the present invention.

What is claimed is:

1. In a method for transferring value between parties that is based on public-key-digital blind signatures, the improvement comprising the steps of:
- diminishing the value of a first blind signature by a first party from an original value to a diminished value;
- communicating said diminished value of said first blind signature in a first message to at least a second party by said first party;
- communicating a blinded second message to said second party by said first party;
- checking the validity of said signature contained in said first message received by at least said second party;
- forming by said second party of a second digital signature on said blinded second message received, and the type of second signature formed responsive to the type of signature checked on said first message, and where the relationship between the type of signature checked on said first message and the type of said second signature formed being such that a higher-valued signature checked corresponds to a lower-valued second signature formed; and
- communicating by said second party said formed second signature to said first party.

2. In the method of claim 1, said diminishing and forming steps cooperating so that the amount of value obtainable by said first party from said second signature is substantially equal to said original value minus said diminished value.

3. In the method of claims 1 or 2, said first party hiding said original value from at least said second party.

4. In the method of claims 1 or 2, said second signature being transformed by said first party into at least part of a blinded message of a subsequent instance of the method of claim 1.

5. In the method of claims 1 or 2, said second signature being transformed by said first party into at least part of at least two different blinded messages of two corresponding subsequent instances of the method of claim 1.

6. In the method of claims 1 or 2, said second signature being transformed by said first party into at least part of a first signature of a subsequent instance of the method of claim 1.

7. In the method of claims 1 or 2, said second signature being transformed by said first party into parts of at least two first signatures used in subsequent instances of the method of claim 1.

8. Apparatus for transferring value between parties that is based on public-key-digital blind signatures, the improvement comprising:
- means for diminishing the value of a first blind signature by a first party from an original value to a diminished value;
- means for communicating said diminished value of said first blind signature in a first message to at least a second party by said first party;
- means for communicating a blinded second message to said second party by said first party;
- means for checking the validity of said signature contained in said first message received by at least said second party;
- means for forming by said second party of a second digital signature on said blinded second message received, and the type of second signature formed responsive to the type of signature checked on said first message, and where the relationship between the type of signature checked on said first message and the type of said second signature formed being such that a higher-valued signature checked corresponds to a lower-valued second signature formed; and
- means for communicating by said second party, only if said check is satisfied, said formed second signature to said first party.

9. In the apparatus of claim 8, said diminishing and forming means cooperating so that the amount of value obtainable by said first party from said second signature is substantially equal to said original value minus said diminished value.

10. In the apparatus of claims 8 or 9, said first party hiding said original value from at least said second party.

11. The apparatus of claims 8 or 9, including means for said second signature to be transformed by said first party into at least part of a blinded message of a subsequent use of the apparatus of claim 8.

12. The apparatus of claims 8 or 9, including means for said second signature to be transformed by said first party into at least part of at least two different blinded messages of two corresponding subsequent uses of the apparatus of claim 8.

13. The apparatus of claims 8 or 9, including means for said second signature to be transformed by said first party into at least part of a first signature of a subsequent use of the apparatus of claim 8.

14. The apparatus of claims 8 or 9, including means for said second signature to be transformed by said first party into parts of at least two first signatures for subsequent uses of the apparatus of claim 8.

* * * * *